Feb. 9, 1965     F. T. GARNER     3,168,927
VEHICLE HAVING BOX-LIKE FRAME
Filed May 7, 1962     2 Sheets-Sheet 1
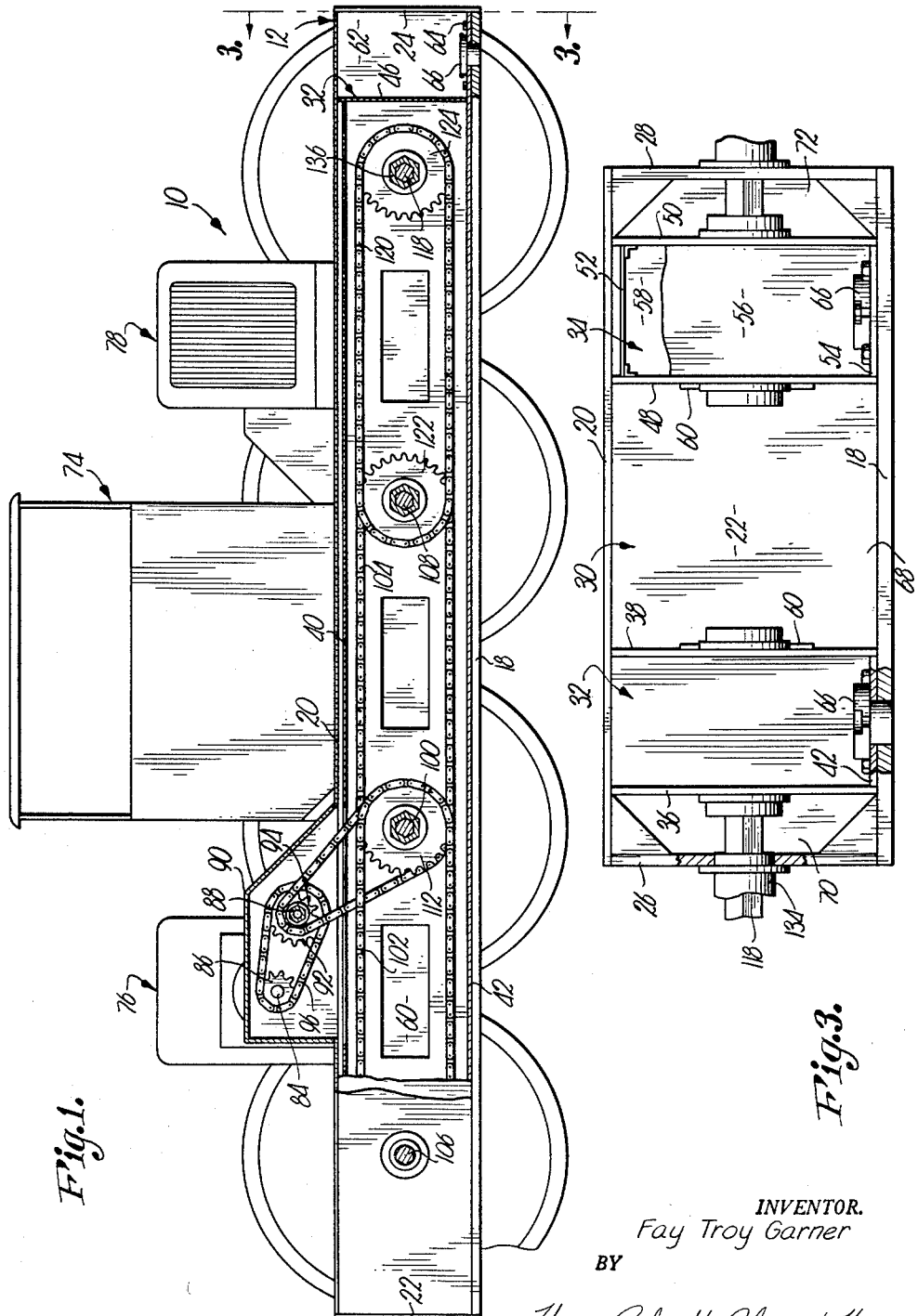
INVENTOR.
Fay Troy Garner
BY
Hovey, Schmidt, Johnson & Hovey
ATTORNEYS.

Feb. 9, 1965   F. T. GARNER   3,168,927
VEHICLE HAVING BOX-LIKE FRAME
Filed May 7, 1962   2 Sheets-Sheet 2
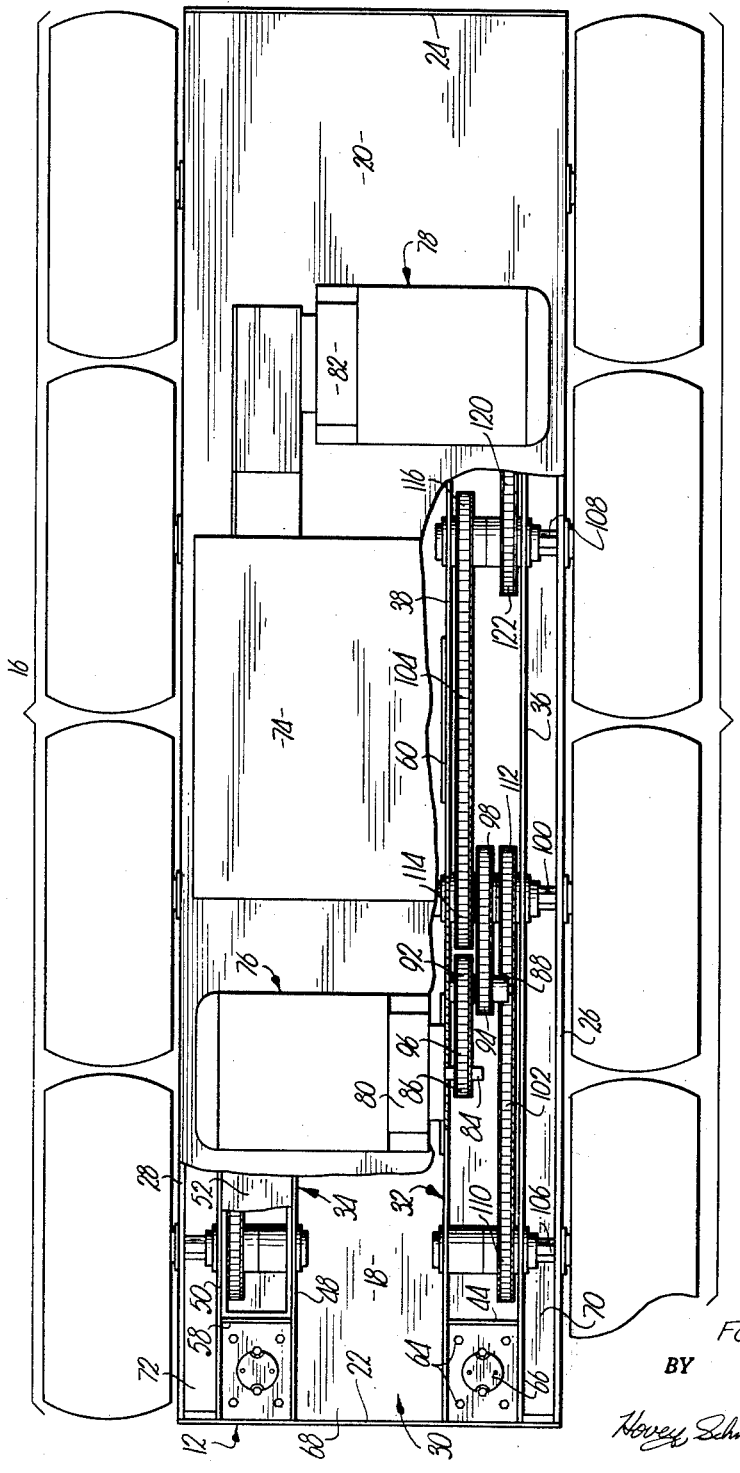
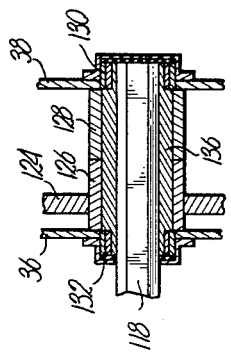
Fig. 4.
Fig. 2.
INVENTOR.
Fay Troy Garner
BY
Hovey, Schmidt, Johnson & Hovey,
ATTORNEYS.

United States Patent Office 3,168,927
Patented Feb. 9, 1965

3,168,927
VEHICLE HAVING BOX-LIKE FRAME
Fay Troy Garner, Rte. 2, Box 136, Berthoud, Colo.
Filed May 7, 1962, Ser. No. 192,769
7 Claims. (Cl. 180—6.48)

This invention relates to vehicles, and more particularly, to heavy duty type of vehicles used in the construction field.

It is the most important object of this invention to provide a vehicle having a frame fabricated from heavy metal materials, which frame is, therefore, of sufficient strength and weight whereby the vehicle may be used for many purposes such as pushing earth-moving and earth-scraping equipment, or as the carrier vehicle for a bulldozer blade, pusher plate, or similar assembly.

A yet further aim of this invention is to provide a vehicle having a frame defined by a plurality of plates whereby to form a compartment, there being a pair of drive assembly housings disposed within said compartment, each of said housings taking the form of a box-like enclosure, the vehicle having a set of wheels on each side thereof carried exteriorly of the frame and each wheel of each set having an axle which is received within a corresponding drive assembly housing whereby the same may be suitably coupled to a power train assembly.

Another object of this invention is to provide a vehicle having a set of driving and supporting wheels on each side of the longitudinal axis thereof, there being a separate motor provided for each set of wheels whereby each of said sets may be driven independently but in unison, the motors each being coupled with their corresponding set of wheels through a power train assembly which includes means interconnecting the axles of each of the wheels and additional driving means coupling the motor with the means interconnecting said axles.

Other objects of this invention include details of construction thereof such as the configuration of the frame; the configuration and disposition of the drive assembly housings carried by said frames; the means for securing said housings to the frame; and other details of construction which will become apparent from the following specification and accompanying drawings, wherein:

FIGURE 1 is a longitudinal, sectional view of the vehicle, parts being broken away to reveal details of construction;

FIG. 2 is a top plan view of the vehicle, parts being broken away to reveal details of construction;

FIG. 3 is a transverse, sectional view of the vehicle taken on line 3—3 of FIG. 1; and FIG. 4 is an enlarged, fragmentary, sectional view of an end axle assembly of the vehicle.

This is a continuation-in-part of my copending application Serial No. 98,690, filed March 27, 1961, and entitled "Pusher Vehicle."

The vehicle is broadly designated by the numeral 10 and comprises a substantially rectangular frame 12, said frame 12 having a set of wheels 14 and 16 mounted exteriorly thereof and on each side thereof respectively.

The frame 12 is formed of heavy sheet steel or the like, there being a base plate 18, a top plate 20, a pair of opposed end plates 22 and 24, and a pair of opposed side plates 26 and 28, said plates 18–28 cooperating to form the frame and define an enclosed compartment 30.

Disposed within the enclosed compartment 30 are a pair of spaced-apart, box-like drive assembly housings 32 and 34, each of said housings 32 and 34 being identical in construction, housing 32 having an outer side wall 36, an inner side wall 38, a top wall 40, a bottom wall 42, and opposed end walls 44 and 46. Likewise, housing 34 has an inner side wall 48, an outer side wall 50, a top wall 52, a bottom wall 54, and opposed end walls 56 and 58.

The height of side walls 36, 38, 48 and 50 of housings 32 and 34 is substantially the same as the distance between top plate 20 and base plate 18 of the frame 12 whereby said housings 32 and 34 may be snugly received within the compartment 30 defined by said plates 18–28 of the frame 12. It is contemplated however, that said housings 32 and 34 will be removable from within compartment 30 whereby access may be gained through access panels such as 60, provided in the inner side walls 38 and 48 of housings 32 and 34 to the drive assembly mechanism which is carried within the housings 32 and 34.

Housings 32 and 34 are of such a length that there is a space 62 between each of the end walls of the respective housings and the corresponding end plates of the frame 12, the bottom walls 42 and 54 of housings 32 and 34 extending into said spaces 62 in overlying relationship to base plate 18. Within this space, the bottom walls 42 and 54 are secured to the base plate 18 by means of bolts 64, and said housings are held in their relative positions within compartment 30 by means of a positioning pin 66, which pin extends through the bottom walls 42 and 54 and into an aperture provided in base plate 18.

Thus, the housings 32 and 34 may be inserted within the compartment 30 defined by the plates of frame 12 and positioned at the desired location in said compartment 30. The housings 32 and 34 will be spaced apart a sufficient distance whereby to define a central chamber 68 and will also be spaced from their corresponding side plates 26 and 28 a sufficient distance whereby to define side areas 70 and 72, said side areas being defined primarily by outer side wall 36 and side plate 26, in the case of area 70, and outer side wall 50 and side plate 28 in the case of area 72.

The top plate 20 of frame 12 serves as a platform and has mounted thereon a suitable cab 74 which encloses the controls for the vehicle, as well as a seat for the operator thereof.

Platform 20 also supports a pair of motors 76 and 78, each of which motors has a brake 80 and 82 respectively associated therewith. Each of motors 76 and 78 is operably connected with a driving assembly for operating a corresponding set of wheels of the vehicle 10, and inasmuch as said driving assemblies and power trains are identical in construction and operation, only one will be hereinafter described.

Thus, each of the power trains is coupled with its corresponding motor by a driving shaft 84 which is directly connected to the motor, the driving shaft 84 carrying a relatively small sprocket wheel 86 which is keyed thereto and rotates at a speed determined by the speed of the motor.

A second shaft 88 is carried within an extension 90 formed on top plate 20, said shaft 88 being suitably journalled within the side walls of said extension, all as best illustrated in FIGS. 1 and 2 of the drawings. Shaft 88 has a relatively large sprocket wheel 92 fixedly secured thereto, preferably by a hexagonal fit, and a second sprocket wheel 94 likewise secured thereto adjacent first sprocket wheel 92. Shaft 88 is driven from motor shaft 84 by means of a chain 96 which is trained over and interconnects sprocket wheel 92 on shaft 88 and sprocket wheel 86 on shaft 84. Power thus delivered to shaft 84 by the motor is transmitted to sprocket wheel 92 carried by shaft 88 and then delivered to sprocket wheel 94, also carried by shaft 88.

Power thus delivered to sprocket wheel 94 is delivered to the corresponding power train assembly of set of wheel and axle assemblies 14 by means of a sprocket 98 which is fixedly carried by one of the axles of said set, the axle to which said sprocket 98 is secured being designated as 100.

Power delivered to axle 100 is transmitted by means of chains 102 and 104 to adjacent axles 106 and 108 respectively, said chains 102 and 104 being trained over sprockets carried by said axles, those sprockets, in the case of chain 102 being designated as 110 carried by axle 106, and 112 carried by axle 100; and in the case of chain 104 as 114 carried by axle 100, and 116 carried by axle 108.

Axle 108 is operably coupled to the remaining axle 118 of set 14 by means of a chain 120 trained over sprocket 122 carried by axle 108 and sprocket 124 carried by axle 118.

The particular manner in which the above described sprockets are secured to their corresponding axles is best illustrated in FIG. 4 of the drawings which shows an axle such as 118 having a sprocket 124 secured thereto by means of a hub 126, which hub has an aperture therethrough having a hexagonal configuration whereby the same may be easily fitted over the axle 118 which likewise is of a hexagonal outer configuration. The hub 126 is carried by axle 118 between the side walls 36 and 38 of the drive assembly housing and is retained in its desired position upon axle 118 by a spacer member 128, all as is clearly illustrated in FIG. 4 of the drawings. FIG. 4 of the drawings also illustrates the manner in which the axle 118 is journalled as at 130 in the inner side wall 38 of its housing 32 and is also journalled as at 132 in the outer side wall of the housing 32. As illustrated in FIG. 3, the axle 118 passes through the side area 70 and is then journalled within the side plate 26 of the frame 12 as by a bearing 134.

The foregoing construction allows the axles 100, 106, 108 and 118 of wheel and axle assembly 14 to be driven simultaneously and in unison through the operation of motor 76 inasmuch as the motor operates shaft 84 which is coupled, through the power train assembly above described, with each of the axles 100, 106, 108 and 118 whereby power transmitted from shaft 84 is equally distributed to said axles to thereby cause simultaneous rotation of the axles of set 14. The same is true with respect to the wheel and axle assemblies of set 16 and it will, therefore, be appreciated that each of the sets 14 and 16 may be independently driven in unison by its corresponding motor, and that steering of the vehicle may be accomplished by varying the flow of power to a selected set 14 or 16, or through the utilization of brakes 80 or 82 to stop one set while the other is allowed to continue to drive.

If it is desired to gain access to the drive assembly housing 32, this may be accomplished either through access panels 60, or if a more detailed inspection is desired, the axles which are coupled with the assembly carried by said housing 32, may be pulled outwardly and the bolts 64 and pin 66 removed, whereby the entire housing 32 may be slipped end-wise from within compartment 30 of frame 12, it being understood that it will be necessary to remove at least one of end plates 22 or 24 to accomplish this removal. After inspection, the housing assembly such as 32, may be easily reinserted within compartment 30, and the axles coupled therewith, merely by inserting the same through the corresponding apertures in the side plate of the frame and the inner and outer side walls of the drive assembly housing 32. In this regard, the hub and the corresponding parts associated therewith, are retained in position by means of a sleeve member 136, best shown in FIG. 4 of the drawings, which has an aperture therethrough having hexagonal configuration complementally receiving a corresponding axle such as 118 illustrated in FIG. 4.

The above described vehicle is preferably formed from a heavy steel sheet material whereby to impart to the vehicle sufficient weight and strength to allow the same to be utilized in heavy construction tasks, such as pushing large earth-moving equipment, pulling such equipment, or serving as the carrier for a pusher plate or bulldozer blade, or other suitable attachment used in the construction field.

The power train assembly as described above, allows simultaneous driving of the wheels of each set and precludes slippage of one of the wheels while giving steady and continuous driving support to the vehicle 10. Further, if one of the wheels of a set should drop into a hole, the remaining set of wheels would provide a continued traction for the vehicle. While each set 14 and 16 has been shown as constituting four wheels in the embodiment of the invention chosen for illustration, it will be appreciated that more or less wheels may be utilized without departing from the scope of this invention.

Having thus described the invention, what is claimed as new and desired to be secured by Letters Patent is:

1. A vehicle comprising a frame having a pair of side plates, a pair of end plates, a base plate, and a top plate whereby to define an enclosed compartment; a pair of box-like drive assembly housings removably carried within said compartment, each housing having an inner side wall, an outer side wall, a pair of opposed end walls, a top wall and a bottom wall, said inner side walls cooperating with said end plates, said base plate and top plate to define a central chamber, said outer side walls cooperating with corresponding side plates, said end plates and said base plate and top plate to define enclosed side areas; a set of driving and supporting wheels carried exteriorly of the frame on each side of the longitudinal axis of the vehicle, each wheel of each set having an axle, each axle extending inwardly through a corresponding side plate, side area, and outer side wall, and having its inner end journalled in the corresponding inner side wall of said housing; a source of power for each set of wheels, said source being coupled with one of the axles of its corresponding set of wheels; and means interconnecting each of the axles of each set of wheels whereby each set may be driven independently and in unison, said means being located within said housings.

2. A vehicle as set forth in claim 1 wherein said means interconnecting the axles of each set of wheels comprise chain and sprocket assemblies.

3. A vehicle as set forth in claim 1 wherein the inner side walls of each housing are provided with removable access panels therein.

4. A vehicle as set forth in claim 1, there being a space between each end wall of the housing and the corresponding end plate of the frame, the bottom wall of the housing extending into said space in overlying relationship to said base plate; and means within said space removably securing said bottom wall to said base plate.

5. A vehicle comprising a frame having a base plate, a top plate, a pair of side plates extending substantially the full length of said top and base plate, and a pair of end plates whereby to define an enclosed compartment; a pair of drive assembly housings within said compartment, each housing having an inner wall, an outer wall, a pair of opposed end walls, a top wall and a bottom wall, said inner walls extending substantially the full length of said top plate and said base plate and cooperating therewith to define a central chamber; a set of driving and supporting wheels carried exteriorly of the frame on each side of the longitudinal axis of the vehicle, each wheel of each set having an axle, each axle extending inwardly through a corresponding side plate and having a free inner end journaled in the inner wall of its corresponding housing; a source of power for each set of wheels, said source being coupled with an axle of its corresponding set of wheels; and means interconnecting the axles of each set of wheels whereby each set may be driven independently and in unison, said interconnecting means being located within said housings.

6. A vehicle comprising a frame having a horizontal base plate, a horizontal top plate and a pair of end plates;

a series of horizontally spaced, vertically disposed plates extending substantially the full length of said top plate and said base plate, spanning the distance therebetween and being secured thereto, said vertical plates cooperating with said base plate and top plate to define a central chamber and a drive assembly housing on each side of said central chamber; a set of driving and supporting wheels carried exteriorly of the frame on each side of the vehicle, each wheel of each set having an axle, each axle extending into said frame and being journaled in at least two of said vertically disposed plates; a source of power for each set of wheels; and drive assembly means in each of said housings, said means coupling said axles with said source of power whereby each set of wheels may be driven separately and independently.

7. A vehicle comprising a single, elongated, hollow body having a longitudinal axis extending fore and aft of the vehicle, said body having a top plate, a base plate, a pair of end plates and a pair of side plates rigid to the top and base plates and extending substantially the full length thereof; a set of ground engaging wheels on each side of the vehicle along and adjacent the outer face of each side plate respectively, exteriorly of the body; an axle for each wheel respectively extending horizontally inwardly into the body through proximal side plates and journaled in the latter; an upright wall within the body for each set of axles respectively, each wall extending longitudinally of the body for substantially the full length thereof, spanning the distance between the top and base plates and being secured to said top and base plates; means journaling the axles in corresponding walls, said walls being spaced from each other and spaced from the side plates, the inner ends of each set of axles being spaced from the inner ends of the other set of axles; a source of power for each set of wheels; and drive assembly means coupling the axles of each set of wheels with its corresponding power source, said drive assembly means being within the body between corresponding side plates and upright walls.

References Cited by the Examiner
UNITED STATES PATENTS

| | | | |
|---|---|---|---|
| 1,430,251 | 9/22 | Parker | 180—6.48 |
| 1,606,707 | 11/26 | Johnston et al. | 180—22 |
| 1,781,978 | 11/30 | Davis | 180—6.7 |
| 2,256,822 | 9/41 | Baker et al. | 180—6.7 |
| 2,605,852 | 8/52 | Rhoads | 180—6.7 |
| 2,642,144 | 6/53 | Brewer | 180—6.48 X |
| 3,052,311 | 9/62 | Leedom | 180—22 X |

PHILIP ARNOLD, *Primary Examiner.*
BENJAMIN HERSH, A. HARRY LEVY, *Examiners.*